(12) United States Patent
May

(10) Patent No.: US 6,997,065 B2
(45) Date of Patent: Feb. 14, 2006

(54) TORQUE MEASUREMENT APPARATUS

(75) Inventor: Lutz Axel May, Gelting (DE)

(73) Assignee: Abas, Incorporated, Chicago, IL (US)

( * ) Notice: Subject to any disclaimer, the term of this patent is extended or adjusted under 35 U.S.C. 154(b) by 140 days.

(21) Appl. No.: 10/973,295

(22) Filed: Oct. 27, 2004

(65) Prior Publication Data

US 2005/0061089 A1 Mar. 24, 2005

Related U.S. Application Data

(62) Division of application No. 10/089,978, filed as application No. PCT/EP00/10022 on Oct. 10, 2000, now Pat. No. 6,826,969.

(30) Foreign Application Priority Data

Oct. 11, 1999 (GB) ............................................... 9924046

(51) Int. Cl.
*G01L 3/10* (2006.01)

(52) U.S. Cl. ............................ 73/862.331; 73/862.333; 73/862.339

(58) Field of Classification Search ............................ 73/862.331–862.339
See application file for complete search history.

(56) References Cited

U.S. PATENT DOCUMENTS

| | | | |
|---|---|---|---|
| 4,374,665 A | 2/1983 | Koon | |
| 4,506,554 A * | 3/1985 | Blomkvist et al. | ..... 73/862.335 |
| 4,647,854 A | 3/1987 | Yamada et al. | |
| 4,762,008 A * | 8/1988 | Kobayashi et al. | ..... 73/862.336 |
| 4,805,463 A | 2/1989 | Kelledes et al. | |
| 5,122,742 A | 6/1992 | Hoffman et al. | |
| 5,307,691 A | 5/1994 | Miyake et al. | |
| 5,351,555 A * | 10/1994 | Garshelis | ............... 73/862.335 |
| 5,394,760 A | 3/1995 | Persson et al. | |
| 5,450,761 A * | 9/1995 | Zilberman et al. | ...... 73/862.329 |
| 5,465,627 A * | 11/1995 | Garshelis | ............... 73/862.335 |
| 5,497,667 A | 3/1996 | Nakaura | |
| 5,520,059 A * | 5/1996 | Garshelis | ............... 73/862.335 |
| 5,811,695 A | 9/1998 | Satoh et al. | |
| 6,035,960 A | 3/2000 | Wakao et al. | |
| 6,330,833 B1 | 12/2001 | Opie et al. | |
| 6,481,296 B1 | 11/2002 | Jin et al. | |
| 6,622,576 B1 | 9/2003 | Nakano et al. | |

FOREIGN PATENT DOCUMENTS

| | | |
|---|---|---|
| EP | 0434089 A | 6/1991 |
| GB | 968503 | 9/1964 |
| WO | WO 99/21150 | 4/1999 |
| WO | WO 99/21151 | 4/1999 |
| WO | WO 99/56099 | 11/1999 |
| WO | WO 01/13081 A1 | 2/2001 |

* cited by examiner

*Primary Examiner*—Max Noori
*Assistant Examiner*—Jermaine Jenkins
(74) *Attorney, Agent, or Firm*—Blank Rome LLP

(57) ABSTRACT

Torque in a shaft is detected by means of non-contacting sensors sensing a torque-dependent magnetic field emanated by an integral transducer region of the shaft that is circumferentially or longitudinally magnetized. The shaft is driven by a motor and subject to a longitudinal magnetic field which acts on interference field. In one implementation of the invention coils are energized to provide a counteracting magnetic field to compensate the interference field.

11 Claims, 3 Drawing Sheets

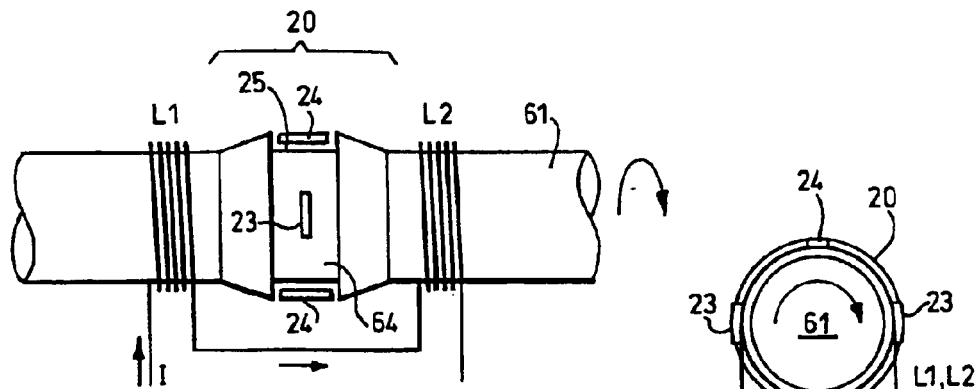
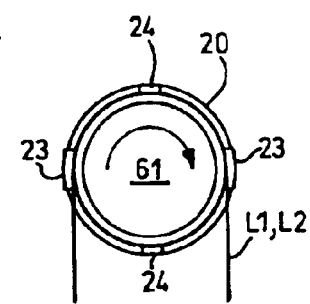
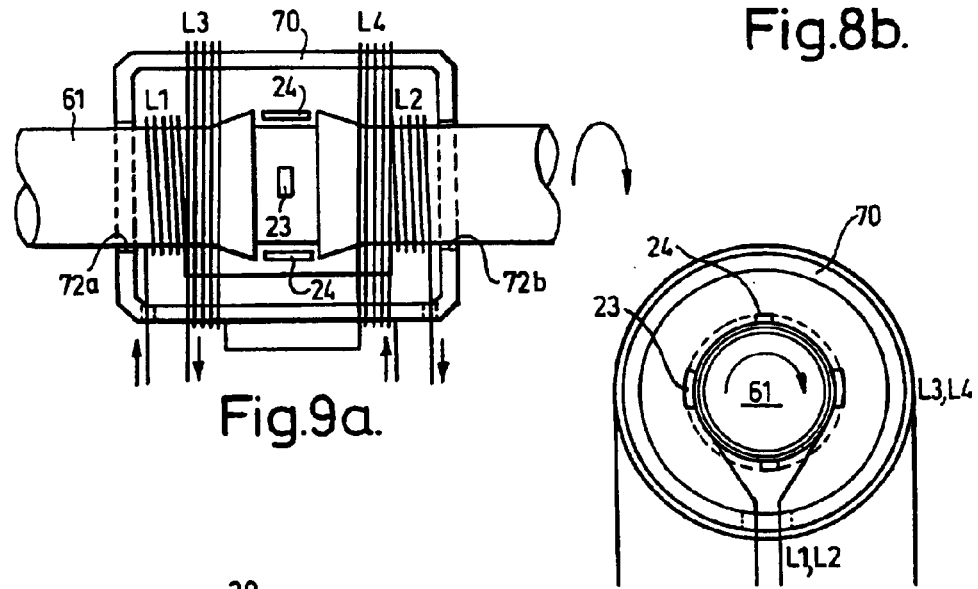
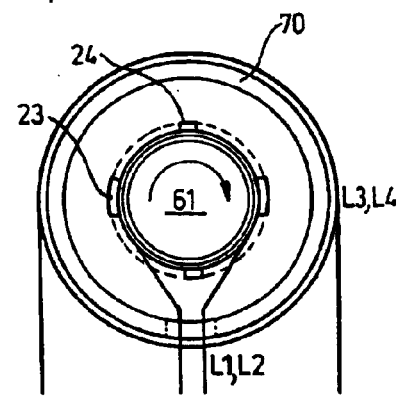
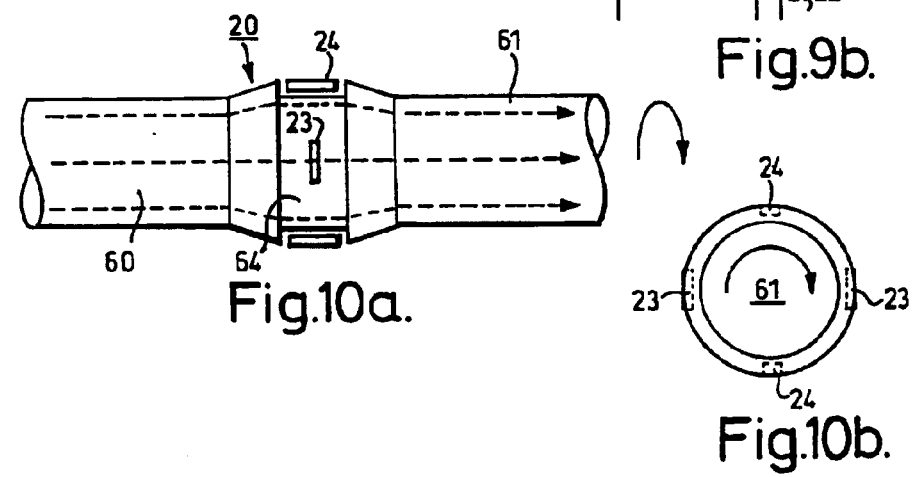
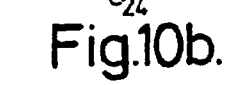

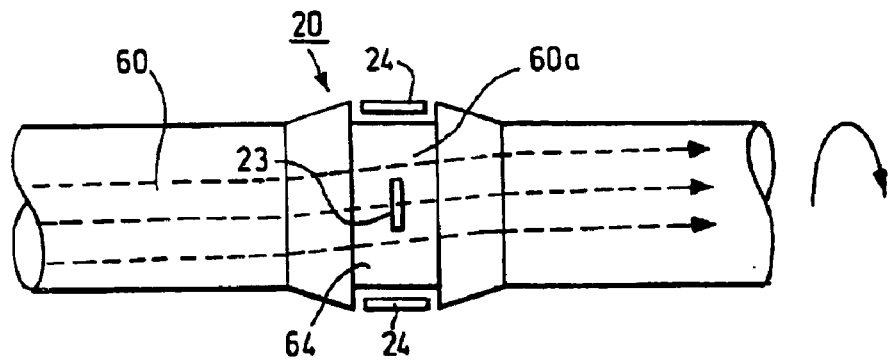
Fig.11.
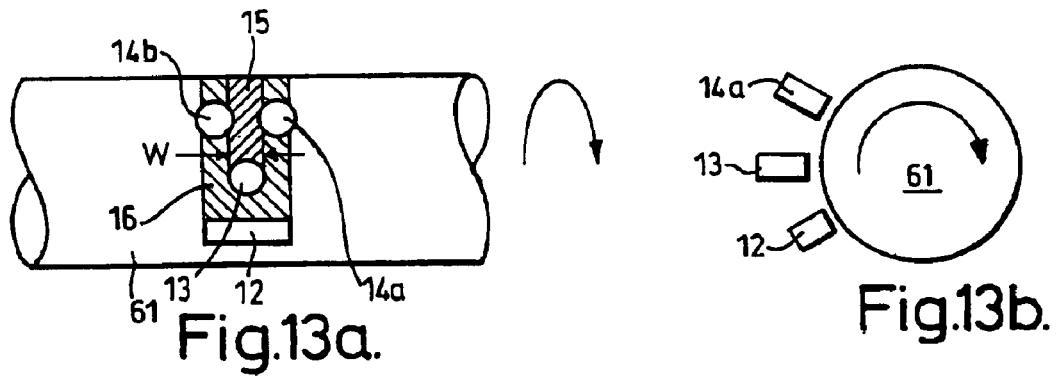
Fig.13a.
Fig.13b.
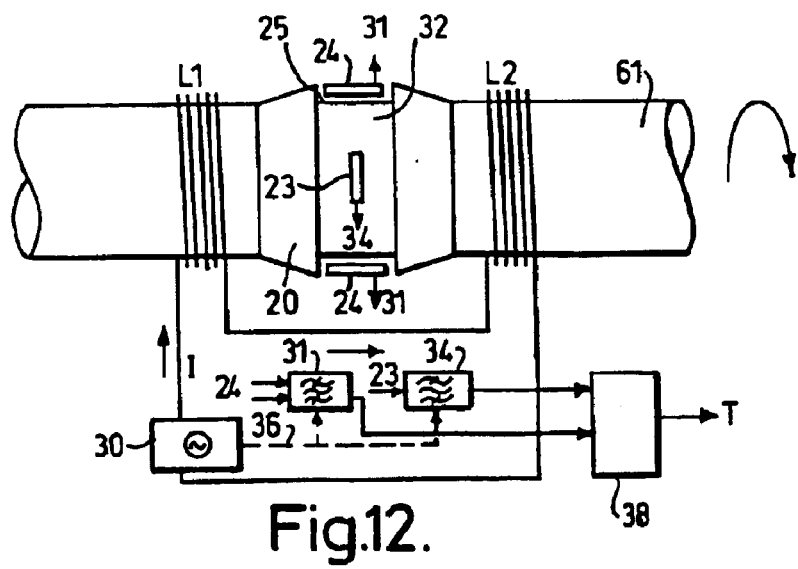
Fig.12.

TORQUE MEASUREMENT APPARATUS

CROSS-REFERENCE TO RELATED APPLICATION

This Application is a Divisional of Application 10/089,978, filed on Jun. 14, 2002, U.S. Pat. No. 6,826,969 which is a 371 of PCT/EP00/10022, filed on Oct. 10, 2000.

FIELD OF THE INVENTION

The present invention relates to the measurement of torque generated in a drive shaft. More particularly, it concerns the non-contacting measurement of such torque using magnetised transducers and seeks to compensate for, eliminate or avoid the effects of interfering magnetic fields.

BACKGROUND TO THE INVENTION

There have been prior proposals to use magnetised transducer elements for torque measurement, the transducer elements being a ring attached to a torqued shaft or the shaft itself. In this connection reference is made to U.S. Pat. Nos. 5,351,555, 5,465,627 and 5,520,059 and to published PCT Applications WO99/21150, WO99/21151 and WO99/56099. In these specifications the ring or shaft is of magnetoelastic material circumferentially magnetised, that is the magnetisation forms a closed loop around the shaft. While such transducer elements are usable in the practice of this invention, other patterns of magnetisation are usable and do not necessarily rely on magnetoelasticity, and other shapes of transducer element may be employed. One other pattern of magnetisation which may be employed in the practice of this invention longitudinal magnetisation of the transducer region. One form of longitudinal magnetisation is disclosed in International patent application PCT/GB00/03119 filed 14th Aug. 2000 and published under the number WO/

It is a feature of transducers systems employing magnetised transducer elements of the kind outlined above, that the torque dependent field component provided by the transducer element can be sensed by one or more sensors adjacent to but not in contact with the transducer elements. Non-contacting sensor arrangements are of particular value in torque measurement on rotating shafts.

The above techniques are based on magnetic principles and therefore can be affected by other interfering magnetic fields, like the earth's magnetic field or fields generated by electric motors for example. In some environments where it is desirable to measure shaft torque, very strong magnetic fields may be present, particularly in the longitudinal axis of the sensing system. A typical application of this nature is the extended axis of an electric motor having a shaft projecting from the motor.

SUMMARY OF THE INVENTION

The present invention is predicated on a number of different approaches. A first may be broadly expressed as compensating or counteracting an interfering magnetic field. A second may be broadly expressed as a selective signal approach, particularly by introducing a frequency selective element into the torque-dependent magnetic flux to be measured that enables it to be distinguished from signals due to an interfering field. A third approach is to turn the "interfering" magnetic field to use and employ it as a source field from which to obtain a torque-dependent component. A fourth approach is a new way of measuring torque to which a frequency selective element may be applied. It is possible to use combinations of these approaches, particularly in combining the first approach with the second or third.

One implementation of the present invention according to the first approach above-mentioned provides a torque transducer for measuring torque in a rotating shaft of the kind having a transducer region in which a magnetic transducer field is established and at least one non-contacting sensor adjacent the transducer region to develop a torque-dependent signal, wherein in operation the shaft is subject to longitudinal flux generated by means external to the transducer region, characterised by means magnetically coupled to said shaft to generate a compensating flux to counteract said longitudinal flux at the transducer region.

Preferably, the means coupled to the shaft for generating the compensating flux comprises at least one current-carrying coil about the shaft. It may comprise a pair of axially spaced coils between which the transducer region is situate. In the alternative or additionally, a magnetic structure may also be provided which has poles axially spaced along the shaft and at least one coil is wound about said magnetic structure.

An implementation of the invention according to the third approach above-mentioned provides a torque transducer for measuring the torque in a rotating shaft which, in operation, has a longitudinal field extending therealong, wherein at least one sensor is placed in non-contacting fashion adjacent a portion of the shaft to sense and provide a signal dependent on a transverse component of flux arising from the longitudinal flux in response to the torque in the shaft. More specifically a transverse component is transverse to the axis of rotation and at the surface of the shaft portion is usually detected as a component in the circumferential or tangential direction. In the preferred embodiment, at least one further non-contacting sensor is mounted to sense the longitudinal flux to provide a reference signal dependent thereon against which to measure the transverse component for use in obtaining a value for the torque in the shaft.

In yet another implementation of the invention, this time in accord with the second, selective signal approach above-mentioned, a torque transducer for measuring the torque in a rotating shaft includes a portion or region of the shaft which acts as a transducer element and which is disposed between a pair of coils encircling the shaft and connected to induce a longitudinal magnetic field through the transducer region upon energisation of the coils. The coils are connected to an AC source, preferably a pulsed source, operating at a selected frequency so that the transducer region is subject to a magnetic field of alternating polarity. A sensor arrangement is responsive to a torque-dependent component of the alternating magnetic field and provides an AC output processed in a frequency-selective manner linked to the source frequency to extract the wanted component from any other noise (DC or AC) that may be present. The frequency-selective processing may be by way of a hardware or software implemented filter operating at the selected frequency linked with the AC source to synchronize the filter frequency to the source frequency. A synchronous detection scheme can be used detecting the sensor output signal with the aid of the AC source output to provide an inherent filtering operation.

According to another implementation, a transducer assembly for measuring, preferably in a non-contacting fashion, torque in a rotating shaft, comprises an erase head for cleaning a zone of the shaft as it rotates, a write head downstream of the erase head in the direction of rotation to write a magnetic track onto the cleaned zone, said track having a given width, a pair of read heads spaced in an axial direction to respond to the magnetic track, said read heads being disposed on, toward or adjacent opposite sides of the track to generate respective signals, and differential means responsive to said respective signals to provide a signal dependent on torque in the shaft. It is preferred to energise the write head with an AC signal, preferably a pulsed signal, to detect the AC outputs of the read heads derived from the AC modulated track. The detection can be done in a frequency-selective manner to enhance discrimination from other signal fields that may be present. It is preferred that the write head be oriented with the head gap in the circumferential or tangential direction.

Aspects and features of this invention are set forth in the claims following this description.

BRIEF DESCRIPTION OF THE DRAWINGS

Embodiments of the invention will now be described by way of example and with reference to the accompanying drawings wherein:

FIGS. 7 and 8a show apparatus for cancelling an interfering magnetic field generated by an electric motor according to a first embodiment of the invention;

FIG. 8b is an end view of the shaft shown in FIG. 8a;

FIGS. 9a and 9b show side and end views of a shielded and actively compensated transducer in accordance with a second embodiment of the invention;

FIGS. 10a and 10b show side and end views, respectively, of apparatus for measuring shaft torque using a magnetic field in the shaft according to a third embodiment of the invention;

FIG. 11 shows a deflected magnetic field in the shaft of FIG. 10a;

FIG. 12 shows an arrangement for eliminating the effects of an interfering magnetic field by using a transducer system operating at a selected frequency in accordance with a fourth embodiment of the invention; and FIGS. 13a and 13b show side and end views of an arrangement for measuring shaft torque using magnetic erase, read and write heads adjacent a shaft, according to a fifth embodiment of the invention.

FIGS. 1 to 3 illustrate detection of shaft torque using the technique of circumferential magnetisation referred to above. FIG. 1 illustrates the circumferential field, indicated by arrow, 2 under no torque condition in a transducer region 3 of a shaft 4 rotatable about axis A—A. FIG. 2 illustrates the closed loop nature of the field in a surface adjacent zone of the region shaft 3. The region 3 exhibits magnetoelasticity. Under "no torque" the circumferential field 2 in region 3 is entirely contained in the region 4: there is no external fringe field. Under torque, as seen in FIG. 3 the field 2 is skewed to produce an axially-directed North-South (NS) magnetisation whose polarity and magnitude are dependent on the direction (clockwise or counterclockwise) of the torque and its magnitude. The axial magnetisation emanates an external fringe field dependent on torque which is measurable by a sensor 7, or more usually by a sensor arrangement comprising a plurality of sensors. The sensor(s) may be of the Hall-effect or magnetoresistive type but preferably are of the saturating core type connected in a circuit such as disclosed in published PCT application WO98/52063.

FIGS. 4 and 5 demonstrate detection of shaft torque using longitudinal magnetisation of a region 3' of the shaft 4. The region 3' is of magnetic material. The longitudinal field 8 lies along the shaft in a surface adjacent annulus forming a torus of magnetic flux which closes mainly in an inner zone of the regions 3' to form a closed toroidal loop. The surface field all lies in the same direction. There is a small quiescent longitudinal fringe field 10 that leaks from the shaft as seen in FIG. 4. In the form of longitudinal magnetisation being discussed, under torque, the field 2' skews (FIG. 5) as indicated by the dashed arrows 2" and produces a small transverse or circumferential component detectable by sensor 22: the longitudinal component is detectable by sensor 21. The sensors of the types already mentioned have directional responses and are oriented to be responsive to the desired field component.

Further information on the form of longitudinal magnetisation discussed above and the means of producing it is found in International patent application PCT/GB00/03119 (WO_____) which is incorporated herein by reference.

Attention can now be given to problems which arise when the shaft 4 is driven, and thus put under torque by a machine such as an electric motor.

Figure 1:
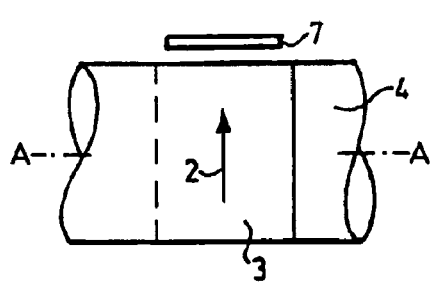
FIGS. 1 to 3 illustrate measurement of shaft torque using circumferential magnetisation.
Figure 2:
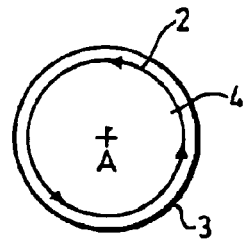
Figure 3:
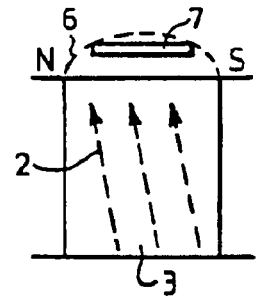
Figure 4:
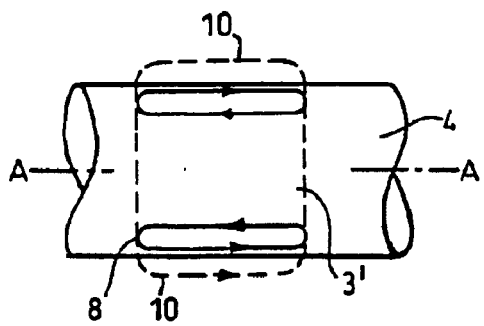
FIGS. 4 and 5 illustrate measurement of shaft torque using longitudinal magnetisation.
Figure 5:
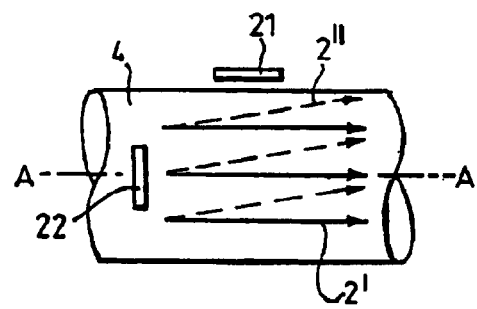
Figure 6:
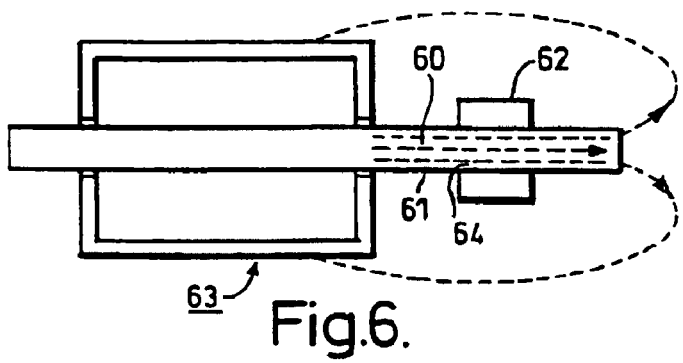
FIG. 6 shows the longitudinal magnetic flux developed in the shaft of a typical electric motor.

An electric motor 63 is diagrammatically shown in FIG. 6. It has an integral output shaft 61 which is susceptible to providing a path for magnetic forces generated by the motor during its operation. Depending on the specific design of the motor and of the shaft 61 driven thereby some magnetic field can exit the motor assembly (unintentionally or inadvertently) through the drive shaft 61 of the motor 63 as indicated by arrows 60. This assumes the shaft is of a ferromagnetic material and is capable of supporting a transducer region of the kind described above in an integral portion of the shaft.

When trying to measure the mechanical torque generated by the electric motor 63 in the shaft 61 by using the methods described above with an appropriate transducer assembly 62 which includes a magnetised transducer region 64 of shaft 61, the motor induced longitudinal magnetic flux 60 present in the transducer region 64 of drive shaft 61 can generate large sensor offset signals. The drive shaft itself provides the magnetic sensor host for the transducer region. These offset signals are modulated by the changes of the mechanical load on the motor axis and the supplied electrical current to the motor. The offset is therefore dynamic and cannot be easily compensated for.

Figure 7:
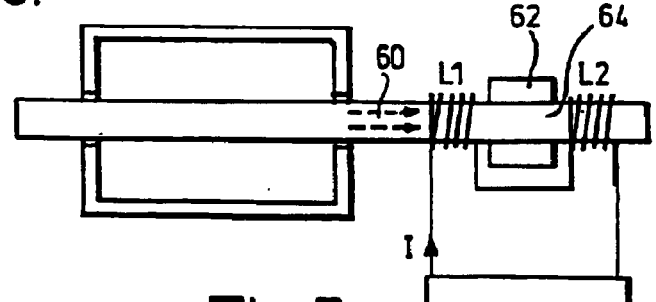

A solution to the problem explained with reference to FIG. 6 is seen in FIG. 7. A pair of coils L1 and L2 are axially spaced about transducer region 64 and they are energised to provide a longitudinal magnetic field in region 64 that counteracts the field due to the motor 63.

As indicated in FIG. 7, the level of the interfering magnetic field strength may be measured in real time by an axially oriented sensor (such as sensor 7 or 21) forming part of the transducer assembly 62 and controlling a compensating current source 65 that energises coils L1 and L2 connected in series with a current I of a magnitude to cancel the motor induced field 60.

To allow measurement of longitudinal (axially-directed) field components of the transducer region, the compensating action can be set up under no torque conditions for circumferential magnetisation, then held at that value. Otherwise the adjustment can be done manually to establish a preset current value. The technique most suitable will depend on the circumstances of each individual installation.

FIGS. 8a and 8b illustrate a preferred implementation of the active compensation technique of FIG. 7. These figures show a collar structure which finds application in various other embodiments of the invention described below. In FIGS. 8a and 8b the shaft 61 is collared at 20 to produce a recess 25 the base of which extends about transducer region 64 and which aids in causing internal longitudinal flux to "leak" externally to the shaft and be detectable. The external longitudinal flux is detected by sensors 24 which may be in controlling a current generating means for energising coils L1, L2 to counteract the external longitudinal flux as previously described and/or as part of the torque measurement process. If the region 64 is longitudinally magnetised torque is measured using sensor 23 (preferably a pair of diametrically opposed sensors) to detect a torque-dependent component of the external flux. In FIG. 7 the transducer region 64 lies between coils L1 and L2 within the sensor arrangement which is adjacent to but does not contact the shaft. Similarly in FIGS. 8a and 8b the magnetised transducer region is located in the region forming the base of recess 25 with non-contacting sensors 23 and 24. The collar structure is applicable to a transducer region circumferentially or longitudinally magnetised. In FIGS. 8a and 8b the sensor arrangement is appropriate to longitudinal magnetisation.

FIGS. 9 and 9b show an arrangement similar to that of FIGS. 7 and 8 in that it seeks to back off or nullify the motor leakage flux in shaft 61. It is intended for higher levels of flux. L1 and L2 are energised as before, for example in dependence on the flux sensed at 24. A housing 70 of magnetic material providing a magnetic shield encloses the transducer region 64 of the shaft 61 and the adjoining coils L1, L2. The shield 70 is apertured at 72a and 72b for passage of the shaft and these apertures provide axially-spaced, magnetic poles of opposite polarity between which the collared region 64 is located. The poles act on the shaft 61 to induce a longitudinal flux through the transducer region 64 to counteract longitudinal flux in the shaft due to the driving motor. The poles 72a, 72b are magnetised by one or more coils wound about the housing 70. Specifically a pair of coils L3 and L4 are shown and L3/L4 are energised by current I' dependent on the flux sensed by 24. The poles concentrate the shield flux. The polarity induced is the same as the coils L1 and L2. For a small shaft diameter the magnetic shield and coil L3/L4 structure enables higher ampere turn ratings to be accommodated for large leakage fluxes. The combination of L3/L4 and shield on one hand and the coils L1/L2 on the other may be applied separately. The shield arrangement may be advantageous when there are other stronger sources of stray magnetic field in the vicinity of the transducer. For example the shield may protect the transducer from fields of the order of 100 or more Gauss, whilst coils L1 and L2 typically protect against fields of the order of tens of Gauss.

A different approach is adopted in the apparatus of FIGS. 10a, 10b and 11. Rather than nullifying the longitudinal flux from motor it is instead used as the transducer flux source in a longitudinal magnetisation type measurement. Here again a collared structure 20 aids in outwardly deflecting the longitudinal flux in the region 64 for producing a longitudinal (axial) directed external field. The longitudinal sensors 24 measure the longitudinal flux (of whatever value). The transverse sensor(s) 23 measures the circumferential component. The torque calculation is made independent of the actual flux in the shaft by using this as a reference. The measurement from sensors 24 is used as a reference against which the torque-dependent component value from sensor (s) 23 is measured.

The axial component (measured by 24) is used to determine the maximum available field strength to measure torque at the sensor region. The result of this measurement is used to control the gain of processing circuitry for providing a signal representing torque. The greater the longitudinal magnetic field 60, the higher the sensitivity of the magnetic field measured by the circumferentially arranged magnetic field sensors. Therefore the amplification gain in the signal conditioning electronics for the circumferentially magnetic field sensors need to be reduced in proportion to an increase in the longitudinal magnetic field.

As shown in FIG. 11, the longitudinal field 60 that extends through the region 64 will be deflected as indicated at 60a in relation to the applied torque forces on the drive shaft 61. The whole shaft effectively acts as a force sensor. The greater the torque, the larger the circumferential component of the field, measured by sensor 23.

In the embodiments of FIG. 7 and FIGS. 8a and 8b, the current in coils L1 and L2 is applied so that the loop fields compensate or nullify the interfering field. A similar coil arrangement to that illustrated in FIG. 7 and in FIGS. 8a and 8b can be used in a different way in a technique which aims to eliminate the effect of the interfering field from the torque-sensing operation rather than cancelling or compensating the interfering field. This is illustrated in FIG. 12.

In FIG. 12 the coils L1 and L2 are not energised in dependence on a sensed field but to the contrary are energised to create a field distinguishable from interfering fields. To this end the coils L1 and L2 are connected to an AC source 30, preferably a pulse-type source, to induce an alternating magnetic field in the transducer region 32 between the coils. This is a longitudinal field. The source frequency should avoid a relationship with main supply frequencies (50 or 60 Hz) or any other frequency imposed by the operation of the motor or machine with which the shaft is associated. Conveniently the source frequency is in the audio range, say between 500 Hz and 10 kHz. A frequency around 1 kHz would be suitable. It is also a frequency within the sensing capability of saturating-core type of sensors. Hall effect or magnetoresistive types of sensor may be expected to have a higher frequency response but frequency limitations may also be imposed in driving the coils L1 and L2.

The alternating magnetic field provides an alternating torque-dependent component at the source frequency sensed by the sensor(s) 23. The total torque-dependent component to which sensor(s) 23 responds may include a DC component from a machine-induced interference field or another AC component associated with the main frequency or a frequency emanating from the motor driving the shaft. The wanted source frequency component is extracted from the unwanted noise components by a filter 34 feeding or included within signal-processing unit 38 from which the torque representing signal T is obtained. The filter 34 may be realised in hardware or software and the filter frequency driven from the source as indicated by the chain line 36 to ensure the filter tracks the source frequency. Synchronous detection in which the detector is drive by a signal from source 30 may be employed. All these techniques are well-known.

The sensors (24) can be used to derive a reference signal for deriving the torque from the torque-dependent component provided by sensor 23. The reference signal in this case is a component at the source frequency and is subject to filtering at 31 in the same way as the torque-dependent component is filtered. To this extent operation is similar to that of the embodiment of FIGS. 10a, 10b and 11.

Another approach to torque measurement is illustrated in FIGS. 12a and 12b. As the shaft 61 rotates a circumferential band 16 is cleaned by a magnetic erase head(s) 12 of the kind used in magnetic recording. Following the erase head (downstream), a write-head 13 writes a magnetic track 15 (of any kind) of width w. The shaft should preferably be rotating at at least 100 rpm when using this technique. The write-head 13 is oriented to have the head gap transverse to the axis of rotation of the shaft and preferably perpendicular to the axis of rotation so that the gap lies tangential or circumferentially disposed with respect to the rotating shaft surface.

The two read-heads 14a and 14b are spaced relative to the width w to give no signal when the shaft is barely rotating or known balanced signals that can be nulled. As torque builds in the shaft it has been found that the signals from the read-heads 14a and 14b become unbalanced to an extent dependent on the value of the torque. This reaction to torque is as if the magnetised track 15 or the flux associated with it is slightly deflected one-way or the other dependent on direction of rotation to produce an unbalance output from the read-heads 14a and 14b that is a measure of torque.

The write-head 13 may preferably modulate the track 15 in some way to provide a signal at each read head that can be separated from noise. To this end the write-head can be energised with a pulse waveform at a given frequency.

Filtering at the source frequency is applied to the read-heads 14a and 14b. This frequency-selective mode of operation is similar to that described for the embodiment of FIG. 12. The read pulses in FIG. 13 will be delayed with respect to the write pulses to an extent which is usable as a measure of the rate of rotation.

What is claimed is:

1. A transducer assembly for measuring, preferably in a non-contacting fashion, torque in a shaft, the assembly comprising:
    an erase head for cleaning a zone of a shaft as it rotates about its longitudinal axis;
    a write head downstream of said erase head in a direction of rotation for writing a magnetic track onto said cleaned zone;
    a first read head;
    a second read head spaced axially apart from said first read head, wherein said first and second read heads are responsive to said magnetic track and wherein said first and second read heads generate respective first and second signals; and
    differential means responsive to said respective first and second signals for providing an output signal related to the torque being applied to said rotating shaft.

2. The transducer assembly according to claim 1, wherein said write head is energized with an alternating current signal at a selected frequency.

3. The transducer assembly according to claim 1, wherein said write head is energized with a pulse waveform signal at a selected frequency.

4. The transducer assembly according to claim 1, wherein said write head is disposed such that a gap between said write head and said rotating shaft is tangential to said axis.

5. The transducer assembly according to claim 1, wherein said track is adaptable to producing a modulated field when said torque is being applied to said rotating shaft.

6. The transducer assembly according to claim 1, wherein said first and second read heads are disposed on, toward, or adjacent opposite sides of said magnetic track.

7. The transducer assembly according to claim 1, wherein said output signal is proportional to said torque being applied to said rotating shaft.

8. A transducer assembly for measuring torque in a shaft, the assembly comprising:
    an erase head for magnetically cleaning a zone of a shaft as it rotates about its longitudinal axis due to a torque being applied to said shaft;
    a write head disposed downstream of said erase head in a direction of rotation for writing a magnetic track onto said magnetically cleaned zone, wherein said write head is energized with a pulse waveform signal at a selected frequency;
    a first read head disposed adjacent said shaft;
    a second read head disposed adjacent said shaft and spaced in an axial direction relative to said first read head, wherein said first and second read heads generate respective first and second signals; and
    a circuit coupled to said first and second read heads for receiving said respective first and second signals and for outputting a difference signal correlated to said torque being applied to said shaft.

9. The transducer assembly according to claim 8, wherein said track is adaptable to producing a modulated field when said torque is being applied to said rotating shaft.

10. The transducer assembly according to claim 8, wherein said first and second read heads are disposed on opposite sides of said magnetic track.

11. The transducer assembly according to claim 8, wherein said output signal is proportional to said torque being applied to said rotating shaft.

* * * * *